US006771767B1

(12) United States Patent
Li et al.

(10) Patent No.: US 6,771,767 B1
(45) Date of Patent: Aug. 3, 2004

(54) SIGNAL DETECTOR WITH COEFFICIENT SWAPPING TRANSFORM UNIT

(75) Inventors: Jin Li, Austin, TX (US); Yan Zhou, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/225,276

(22) Filed: Jan. 5, 1999

(51) Int. Cl.$^7$ ............................. H04M 1/00; H04M 3/00
(52) U.S. Cl. ....................... 379/386; 379/282; 379/283; 379/284; 370/526
(58) Field of Search ................................ 379/386, 283, 379/282, 339, 284; 370/526; 324/76.41

(56) References Cited

U.S. PATENT DOCUMENTS

| | | | | |
|---|---|---|---|---|
| 4,990,848 A | * | 2/1991 | So ........................... | 324/76.41 |
| 5,163,050 A | * | 11/1992 | Cromack .................... | 370/526 |
| 5,588,053 A | | 12/1996 | Xie | |
| 5,644,634 A | | 7/1997 | Xie et al. | |
| 5,809,133 A | * | 9/1998 | Bartkowiak et al. ........ | 379/386 |
| 6,370,244 B1 | * | 4/2002 | Felder et al. ............... | 379/386 |
| 6,381,330 B1 | * | 4/2002 | Johanson .................... | 379/386 |

OTHER PUBLICATIONS

Digital Signal Processing Applications Using the ADSP–2100 Family, vol. 1 by the Applications Engineering Staff of Analog Devices, DSP Division, Edited by Army, Mar. 1992 by Analog Devices, Inc., pp. 456–477.

* cited by examiner

Primary Examiner—Minsun Oh Harvey
Assistant Examiner—Con P. Tran
(74) Attorney, Agent, or Firm—Williams, Morgan & Amerson, P.C.

(57) ABSTRACT

A signal detector includes a transform unit and a post processing test unit. The transform unit is adapted to a transform unit adapted to receive at least first and second frames of input samples, determine a first plurality of energy values for the first frame based on a first set of transform coefficients, and determine a second plurality of energy values for the second frame based on a second set of transform coefficients. The post processing test unit is adapted to identify at least one target frequency based on the first plurality of energy values. The second set of transform coefficients is based on the target frequency, and the post processing unit is adapted to determine the presence of a first signal in the input samples based on the second plurality of energy values. A method for detecting a signal is provided. A first frame of input samples is received. A first set of transform coefficients is determined based on a first plurality of frequencies. A first plurality of energy values is determined based on the first set of transform coefficients. A target frequency is determined from the first plurality of frequencies based on the first plurality of energy values. A second set of transform coefficients is determined based on the target frequency. A second frame of input samples is received. A second plurality of energy values is determined based on the second set of transform coefficients. The presence of the signal in the input samples is determined based on the second plurality of energy values.

33 Claims, 3 Drawing Sheets

SIGNAL DETECTOR WITH COEFFICIENT SWAPPING TRANSFORM UNIT

BACKGROUND OF THE INVENTION

1. Field of the Invention

The present invention relates generally to the detection of signals, such as dual tone multi-frequency (DTMF) coded signals, and more particularly, to reducing the complexity of a signal detector by swapping coefficients in the transform unit used to determine signal energies at targeted frequencies.

2. Description of the Related Art

DTMF is the signaling standard for the Touch Tone system. Two tones are combined to define a DTMF digit. Table 1 shows the matrix of frequencies used to encode the 16 DTMF symbols on a typical 4×4 matrix telephone keypad. Each DTMF tone consists of two sine waves. One sine wave is from the low-frequency band (row frequency), and the other frequency is from the high-frequency band (column frequency).

TABLE 1

|     | 1209 | 1336 | 1477 | 1633 |
| --- | --- | --- | --- | --- |
| 697 | 1 | 2 | 3 | A |
| 770 | 4 | 5 | 6 | B |
| 852 | 7 | 8 | 9 | C |
| 941 | * | 0 | # | D |

Various methods have been used for DTMF generation and detection. Previously, analog circuitry had been used to generate and decode DTMF digits. More recently, the functions have been implemented using digital signal processors (DSP) to improve the accuracy, precision, stability, reprogrammability, and cast. A popular DSP algorithm for DTMF detection is the Goertzel algorithm. One such previous method is described in U.S. Pat. No. 5,644,634, issued to Zheng-yi Xie et al., entitled "System and Method for Dual Tone Multifrequency Detection Using Variable Frame Widths," the specification of which is hereby incorporated by reference in its entirety.

In general, a DTMF detector examines the line or communication channel for the presence of two sinusoids using dedicated frequency domain algorithms, including modified Goertzel algorithms, DFT/FFTs, auto-correlation, zero crossing counting, and narrow band filter-based methods, among others.

A common technique for determining energy values in the frequency domain is performed by transforming the time domain sampling data to frequency domain data using a variant of the discrete Fourier transform (DFT) called the Goertzel algorithm. The transfer function for the Goertzel algorithm is:

$$H_k = \frac{1 - e^{j2\pi\frac{k}{N}}}{1 - c \cdot z^{-1} + z^{-2}}, \tag{1}$$

where c is the Goertzel coefficient, c=2 cos $$\left(2\pi\frac{k}{N}\right)$$

and N is the number of samples in a frame. The value of k is defined by:

$$k = \frac{N}{F_s} \cdot F_{tone}, \tag{2}$$

where $F_s$ is the sampling frequency (i.e., 8 kHz in typical telephone systems), $F_{tone}$ is the frequency nearest the DTMF frequency that keeps the value of k to an integer. The energy of each DTMF frequency is calculated by the feed forward and feedback phase. The feedback phase is calculated as:

$$Q(n)=c \cdot Q(n-1)-Q(n-2)+x(n), \tag{3}$$

where Q(−1)=Q(−2)=0, n=0, 1, 2, . . . , N−1. Q(n−1) and Q(n−2) are feedback storage elements for a frequency point, and x(n) is the current input sample value. Q(n) is referred to as the delay value.

The energy in each DTMF frequency bin is calculated in the feedforward phase (i.e., n=N) by the equation:

$$E(dtmf)=Q^2(n-1)+Q^2(n-2)-Q(n-1) \cdot Q(n-2) \cdot c. \tag{4}$$

After the energy of each DTMF frequency is calculated, the largest magnitude in each frequency band is compared to a threshold. If the energy in one of the bins exceeds the threshold, a DTMF tone is present.

In accordance with industry standards, a DTMF detector should detect a DTMF tone have less than 1.5% frequency distortion and reject a tone having more than 3.5% distortion. A commonly used twist test detects an energy variation due to an amplitude variation. The allowable energy difference between row and column frequencies for a given detection is between −8 dB and 4 dB (i.e., amount of twist). The twist test is not effective in determining energy variations due to frequency distortion. For example, consider the case where the row frequency of Digit "1" varies by 3%. The energy of the row frequency drops by about 1 dB, but the twist test limits are still met. Current DTMF detectors have difficulty discriminating between energy variations due to frequency variation and those caused by amplitude variation, and accordingly, the frequency selectivity of the detector is reduced.

The present invention is directed to overcoming, or at least reducing the effects of, one or more of the problems set forth above.

SUMMARY OF THE INVENTION

One aspect of the present invention is seen in a signal detector including a transform unit and a post processing test unit. The transform unit is adapted to a transform unit adapted to receive at least first and second frames of input samples, determine a first plurality of energy values for the first frame based on a first set of transform coefficients, and determine a second plurality of energy values for the second frame based on a second set of transform coefficients. The post processing test unit is adapted to identify at least one target frequency based on the first plurality of energy values. The second set of transform coefficients is based on the target frequency, and the post processing unit is adapted to determine the presence of a first signal in the input samples based on the second plurality of energy values.

Another aspect of the present invention is seen in a method for detecting a signal. A first frame of input samples is received. A first set of transform coefficients is determined based on a first plurality of frequencies. A first plurality of energy values is determined based on the first set of transform coefficients. A target frequency is determined from the first plurality of frequencies based on the first plurality of energy values. A second set of transform coefficients is determined based on the target frequency. A second frame of input samples is received. A second plurality of energy values is determined based on the second set of transform coefficients. The presence of the signal in the input samples is determined based on the second plurality of energy values.

BRIEF DESCRIPTION OF THE DRAWINGS

Other objects and advantages of the invention will become apparent upon reading the following detailed description and upon reference to the drawings in which.

Figure 1:
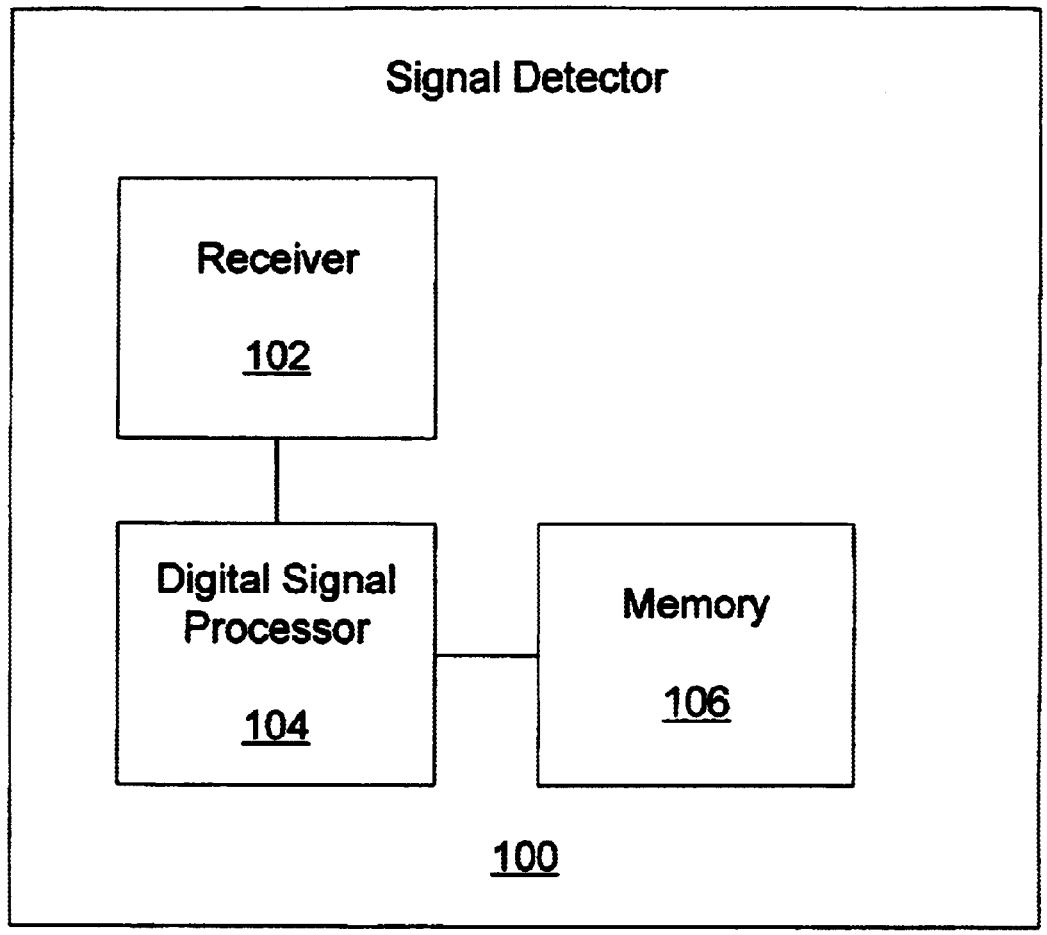
FIG. 1 is a block diagram of a signal detector in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a block diagram of a signal detector 100 is provided. The signal detector 100 includes a receiver 102, a digital signal processor 104, and a memory 106. The receiver 102 receives an analog signal and converts the analog signal into digital format. The receiver 102 samples the analog signal and utilizes pulse code modulation (PCM) or other suitable techniques to produce corresponding digital data. The receiver 102 may include linear analog to digital (A/D) converters (not shown). In the illustrated embodiment, the receiver 102 samples at a frequency of 8 kHz, a common sampling frequency used in telephone systems.

It is noted that the received signal may be compressed or companded, and thus digital data produced by the A/D converter (not shown) in the receiver 102 may be companded (i.e., may comprise logarithmically compressed digital data). As is well-known in the art, companding refers to logarithmically compressing a signal at the source and expanding the signal at the destination to obtain a high end-to-end dynamic range while reducing dynamic range requirements within the communication channel. If the signal is companded, the receiver 102 logarithmically expands the data to a linear format. It is also contemplated that the signal detector 100 may receive digital signals (i.e., linear or logarithmic) directly, and thus a receiver 102 is not required in the signal detector 100 for analog to digital conversion.

The frequency domain energy values calculated for the DTMF frequencies are used to determine the presence of a DTMF signal. A variety of tests known in the art may be performed to determine the presence of a valid DMTF signal and to reject false detections caused by imitation signals, such as noise, voice, or music. The series of tests performed on the energy values are referred to as post-processing tests. In the illustrated embodiment, the generation of the energy values and the post processing tests are performed by the digital signal processor 104.

The memory 106 may be a read-only memory, a random access memory, or a combination thereof. The memory 106 may be employed to store program instructions for execution by the digital signal processor 104. Also, the results of calculations completed by the digital signal processor 104 may be stored in the memory 106. It is also contemplated that a microprocessor (not shown) or other type of general purpose processor (not shown) may be used to perform any or all of the functions of the receiver 102 and/or the digital signal processor 104. In the illustrated embodiment, the digital signal processor is an ADSP-2181, sold by Analog Devices, Inc.

Figure 2:
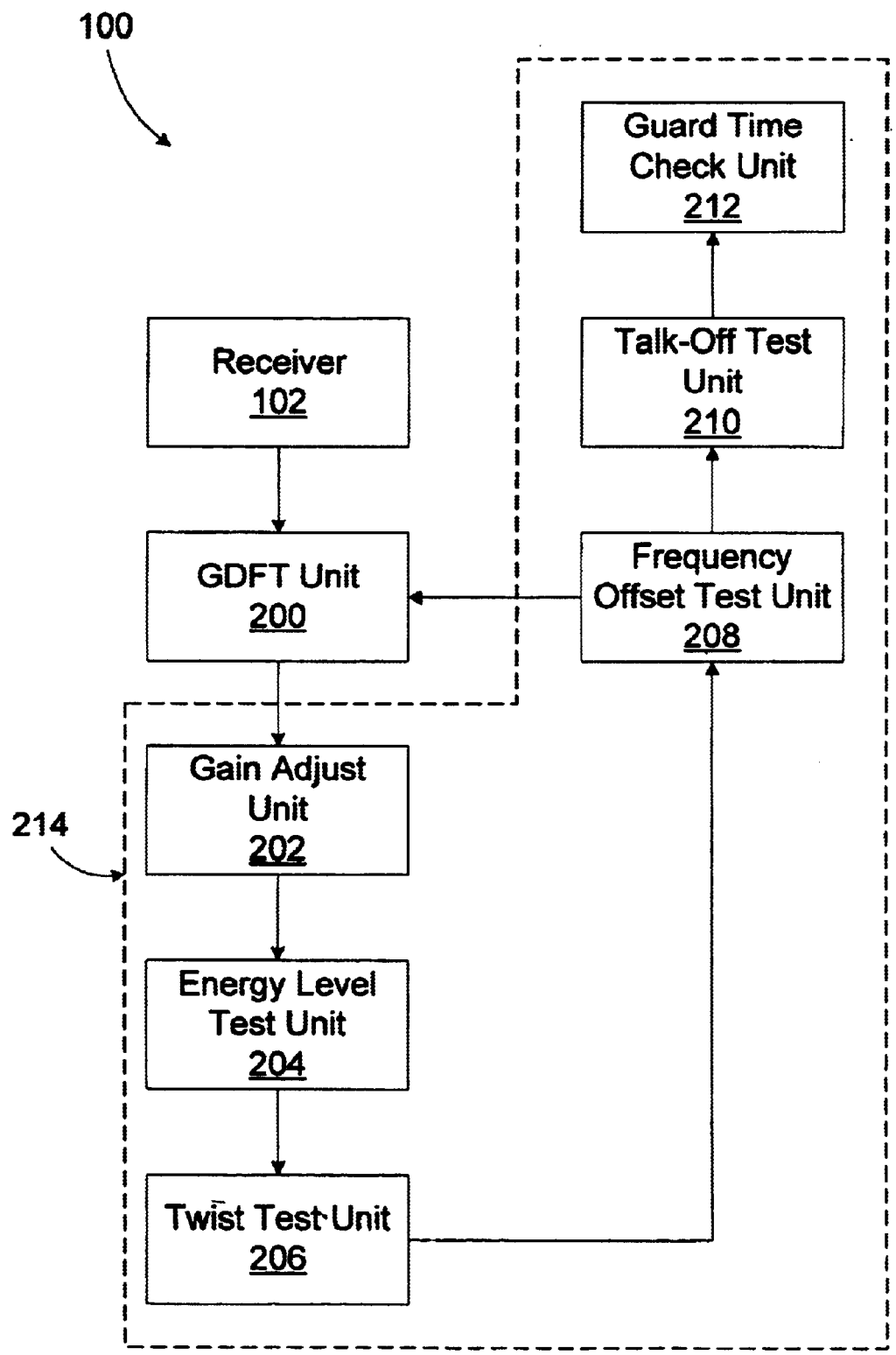
FIG. 2 is a functional block diagram of the signal detector of FIG. 1.

A functional block diagram of the signal detector 100 is provided in FIG. 2. The signal detector 100 includes the receiver 102 adapted to sample the input signal, and a Goertzel Discrete Fourier Transform (GDFT) unit 200 adapted to transform the time domain samples of the receiver 102 to frequency domain energy values using the equations described above. The GDFT unit 200 is adapted to determine energy values for the DTMF frequencies, their second harmonics, and specified cutoff frequencies for testing the frequency distortion. The GDFT unit 200 does not calculate all of these values for every frame. As described in greater detail below in reference to FIG. 3, the signal detector 100 employs a coefficient swapping technique to determine the energies of the eight DTMF frequencies for a first frame, and in response to detection a DTMT signal, determines the energy of the identified tones, their second-harmonics, and their cutoff frequencies.

For purposes of illustration, exemplary post processing tests are described. It is contemplated that only a portion of these tests may be employed by the signal detector 100, or other additional tests may be included. To perform the post processing tests the signal detector 100 includes a gain unit 202 adapted to scale the output of the GDFT unit 200 based on any asymmetry in frame widths between the frequencies. A signal detector having frame widths optimized for the various DTMF frequencies is described in U.S. patent application Ser. No. 09/196,267, entitled "SIGNAL DETECTOR WITH DURATION BASED FRAME WIDTH," and incorporated herein by reference in its entirety.

The signal detector 100 also includes an energy level test unit 204 adapted to compare the largest row and column DTMF energy values to a minimum threshold, and a twist test unit 206 adapted to determine if the power level difference between the largest row and column energy values is within a limit. A frequency offset test unit 208 is adapted to determine if the frequency offset of each DTMF frequency is within a limit, and a talk-off test unit 210 is adapted to compare the second harmonics of the DTMF frequencies to a harmonic threshold to determine if a DTMF detection might have been simulated by speech. The harmonic threshold may be static (i.e., a fixed value) or dynamic (i.e., based on the DTMF energy).

A guard time check unit 212 is adapted to determine if the DTMF tone has an acceptable duration (i.e., greater than 20 ms). In the illustrated embodiment, the frame size is about 106 samples (i.e., 13.25 ms). If at least two consecutive detections for a particular digit are identified, the guard time is inherently met. Functions and algorithms to implement the post processing tests described above are known in the art and, for clarity, they are not further described herein unless necessary to illustrate the application of the present invention. Also, it is contemplated that the tests illustrated in FIG. 2 may be performed in an order different from that shown, depending on the specific implementation. Collectively, the gain unit 202, energy level test unit 204, twist test unit 206, frequency offset test unit 208, talk-off test unit 210, and guard time check unit 212 may be referred to as a post processing unit 214.

The operation of the frequency offset test unit 208 is now described in greater detail. To identify frequency distortion, the frequency offset test unit 208 evaluates the energy at the DTMF frequency and the values at the cutoff frequencies. If the cutoff frequency energy value times a frequency offset threshold exceeds the DTMF frequency energy value, the detection is abandoned. The frequency offset test is defined by the equation:

$$E_{DTMF} > T_{FO} \cdot E_{CO} \tag{5}$$

In the illustrated embodiment, the cutoff frequencies and frequency offset threshold are set such that a detection is abandoned if the frequency offset is greater than about ±2.5%. In the illustrated embodiment, the frequency offset threshold is about 10 dB. It is contemplated that other cutoff frequencies and frequency offset thresholds may be used depending on the degree of frequency selectivity desired and the specific cutoff frequencies. Table 2 illustrates exemplary cutoff frequencies used for the frequency offset determination in the illustrated embodiment.

TABLE 2

| | DTMF Frequency | | | | | | | |
|---|---|---|---|---|---|---|---|---|
| | 697 | 770 | 852 | 941 | 1209 | 1336 | 1477 | 1633 |
| Left Cutoff | 620 | 688 | 770 | 852 | 1110 | 1235 | 1315 | 1447 |
| Right Cutoff | 770 | 852 | 930 | 1025 | 1336 | 1430 | 1640 | 1789 |

If the energies at the cutoff frequencies were to be determined for each frame, the computational resources and memory required to support the GDFT unit 200 would double (i.e., 16 Cut-off energies+existing 16 DTMF and harmonic energies). To avoid this resource burden, the signal detector 100 employs a coefficient swapping technique.

Figure 3:
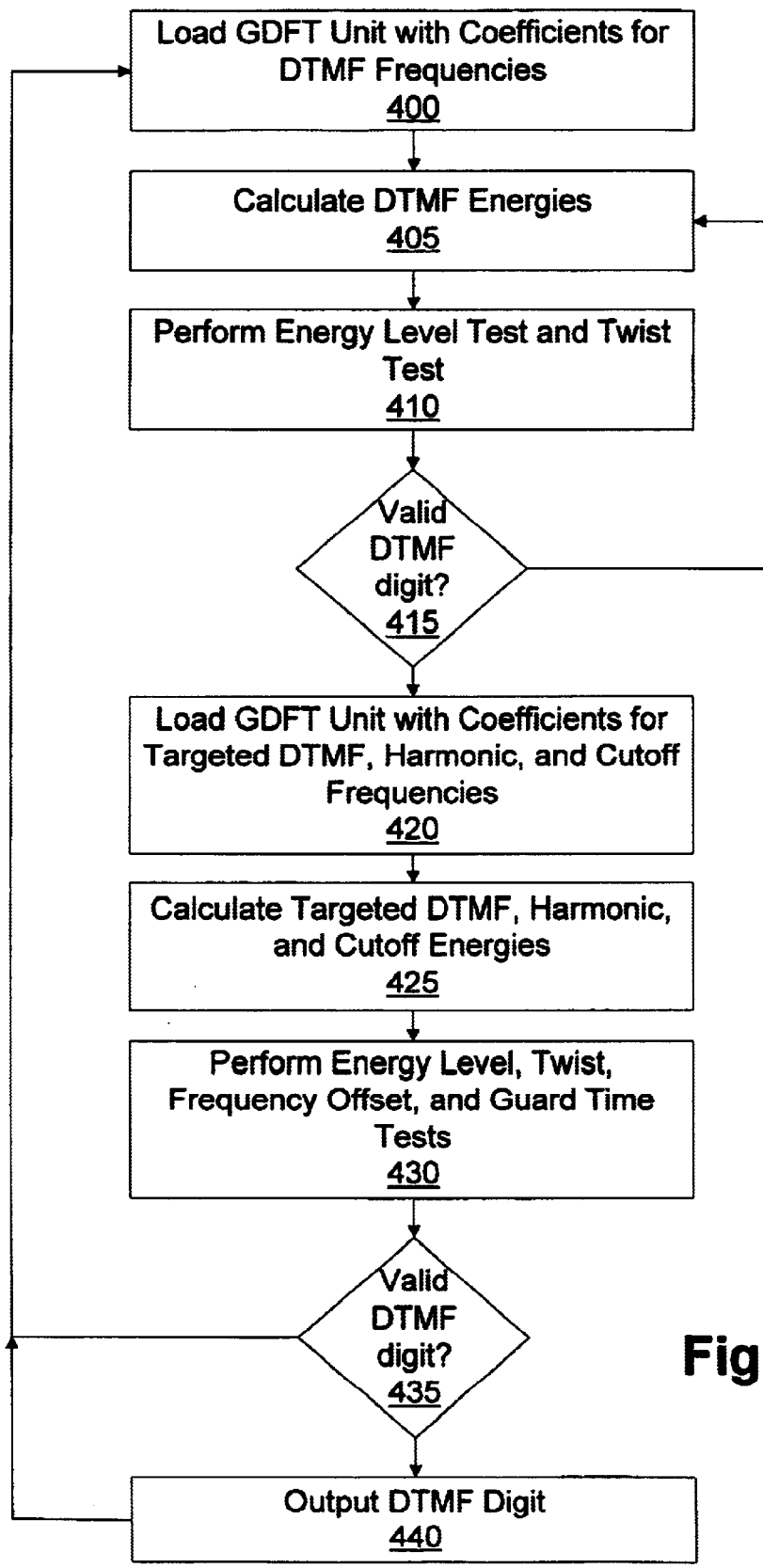
FIG. 3 is a flow chart illustrating a coefficient swapping technique implemented by the signal detector of FIG. 1.

Turning to FIG. 3, a flow chart of the coefficient swapping technique is illustrated. The GDFT unit 200 is loaded with the coefficients necessary to calculate the energy values at the eight DTMF frequencies (DTMF coefficients) in block 400. The GDFT unit 200 determines the DTMF frequency energy values for a first frame in block 405. An energy level and twist test are performed in block 410 by the energy level test unit 204 and the twist test unit 206, respectively. If no DTMF digit is identified in block 415 based on the energy level and twist tests, the GDFT unit 200 calculates the DTMF frequency values for the next frame in block 405, and the process continues until a valid digit is identified.

If a valid DTMF digit is detected in block 415, the GDFT unit 200 is loaded with coefficients for calculating the energies of the targeted DTMF frequencies for the identified digit (i.e., one row frequency and one column frequency), the second harmonics of the targeted frequencies, and the cutoff frequencies for the targeted frequencies (target coefficients) in block 420. In block 425, the energy values of the targeted DTMF, harmonic, and cutoff frequencies for a second frame are determined. In the illustrated embodiment, the sample size for the DTMF frequencies is optimized for each frequency. The sample size for the second harmonics and the cutoff frequencies is about 106 samples, however, it is contemplated that these frequencies may also be optimized.

In block 430, the energy level and twist tests are performed for the targeted DTMF frequencies. The frequency offset test is performed by the frequency offset test unit 208 as described above to determine if the frequency distortion is within allowable tolerances. The talk-off test unit 210 determines if the second harmonics of the targeted frequencies are below a specified threshold, and the guard time check unit 212 verifies that the tone is of sufficient duration (e.g., 20 ms).

If all of the post processing tests performed in block 430 pass, a valid DTMF digit is identified in block 435, and the DTMF digit is outputted in block 440. If the post processing tests of block 430 do not all pass, the GDFT unit 200 is loaded with the DTMF coefficients in block 405 and detection continues on subsequent frames.

During or after completion of the post processing tests described above, it is contemplated that the digital signal processor 104 may set a flag (not shown) in the memory 106 to indicate the detection or non-detection of a DTMF signal.

If a valid DTMF signal for a digit other than the targeted digit were to be received during the second frame, it might be missed due to the targeted coefficients. This situation might occur if a false detection is generated for the first frame. In the illustrated embodiment, the frame size is about 106 samples, or 13.25 ms. Even if the true DTMF signal were not detected until the third frame (i.e., first frame— false detection, second frame—missed due to targeted coefficients, third frame—valid DTMF signal), the valid DTMF signal would still be detected. Per industry standards, a DTMF signal should have a duration of at least 40 ms. Accordingly, the valid DTMF signal would be detected in frames three and four by the method described above.

Swapping the DTMF coefficients and the targeted coefficients during the detection process reduces the complexity of the GDFT unit 200, and accordingly, the resources needed to support it, by one half as compared to a traditional DTMF detector (not shown). Only eight energy values are computed for each frame as opposed to the 16 computed for the traditional DTMF detector (not shown). Also, if the traditional DTMF detector (not shown) were to be augmented to add the frequency offset test, 32 energy calculations would be required.

Although the coefficient swapping technique is described as it may be used to generate cutoff frequency energy values without increasing complexity, it may also be applied to a signal detector 100 for calculating standard DTMF energy values. For example, in the first frame the energy values for all of the DTMF frequencies are calculated, and a target digit is identified. On the second frame, only the target frequencies and the harmonics are calculated. Second and third harmonic energies may also be calculated in lieu of the frequency offset energies. Accordingly, the GDFT unit 200 need only calculate a maximum of eight energy values for any given frame. As a result, the processing requirements of the digital signal processor 104 could be reduced, thus reducing the cost of the signal detector 100.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A signal detector, comprising:
   a transform unit adapted to receive at least first and second frames of input samples, determine a first plurality of energy values for the first frame based on a first set of transform coefficients, and determine a second plurality of energy values for the second frame based on a second set of transform coefficients; and a post processing test unit adapted to identify at least one target frequency based on the first plurality of energy values, wherein the second set of transform coefficients is based on the target frequency, and the post processing unit is adapted to determine the presence of a first signal in the input samples based on the second plurality of energy values.

2. The signal detector of claim 1, wherein the first plurality of transform coefficients corresponds to a plurality of dual-tone multifrequency signal frequencies.

3. The signal detector of claim 2, wherein the target frequency comprises at least one of the dual-tone multifrequency signal frequencies.

4. The signal detector of claim 1, wherein the second plurality of transform coefficients depends on a harmonic frequency associated with the target frequency, the second plurality of energy values includes a harmonic energy value based on the harmonic frequency, and the post processing unit is adapted to determine the presence of the first signal in the second frame based on the harmonic energy value.

5. The signal detector of claim 4, wherein the post processing unit is adapted to compare the harmonic energy value to a static harmonic threshold.

6. The signal detector of claim 4, wherein the post processing unit is adapted to compare the harmonic energy value to the target energy value.

7. A signal detector for detecting a first signal, comprising:

a processor adapted to receive at least first and second frames of input samples; and a memory device coupled to the processor and adapted to store program instructions, that when executed by the processor:

determine a first set of transform coefficients based on a first plurality of frequencies, determine a first plurality of energy values based on the first set of transform coefficients;

determine a target frequency from the first plurality of frequencies based on the first plurality of energy values;

determine a second set of transform coefficients based on the target frequency;

receive a second frame of input samples determine a second plurality of energy values based on the second set of transform coefficients; and determine if the first signal is present in the input samples based on the second plurality of energy values.

8. A method for detecting a dual-tone multifrequency signal, comprising:

receiving a first frame of input samples;

determining a first set of transform coefficients based on a plurality of row frequencies and a plurality of column frequencies;

determining a plurality of row energy values for the first frame based on the first set of transform coefficients;

determining a plurality of column energy values for the first frame based on the first set of transform coefficients;

identifying a maximum row energy value from the plurality of row energy values and a maximum column energy value from the plurality of column energy values, the row frequency corresponding to the maximum row energy value defining a target row frequency and the column frequency corresponding to the maximum column energy value defining a target column frequency;

determining a row harmonic frequency associated with the target row frequency and a column harmonic frequency associated with the target column frequency;

receiving a second frame of input samples;

determining a second plurality of energy values for the second frame, the second plurality of energy values including a target row energy value based on the target row frequency, a target column energy based on the target column frequency, a row harmonic energy value based on the row harmonic frequency, and a column harmonic energy value based on the column harmonic frequency;

determining if a row signal is present in the second frame based on the row harmonic energy value; and determining if a column signal is present in the second frame based on the column harmonic energy value.

9. The method of claim 8, wherein determining if a row signal is present includes comparing the row harmonic energy value to a static harmonic threshold, and determining if a column signal is present includes comparing the column harmonic energy value to the static harmonic threshold.

10. The method of claim 8, wherein determining if a row signal is present includes comparing the row harmonic energy value to the target row energy value, and determining if a column signal is present includes comparing the column harmonic energy value to the target column energy value.

11. A method for detecting a signal, comprising:

receiving a first frame of input samples;

determining a first set of transform coefficients based on a first plurality of frequencies;

determining a first plurality of energy values based on the first set of transform coefficients;

determining a target frequency from the first plurality of frequencies based on the first plurality of energy values;

determining a second set of transform coefficients based on the target frequency;

receiving a second frame of input samples;

determining a second plurality of energy values based on the second set of transform coefficients; and determining if the signal is present in the input samples based on the second plurality of energy values.

12. The method of claim 11, wherein the first plurality of transform coefficients corresponds to a plurality of dual-tone multifrequency signal frequencies.

13. The method of claim 12, wherein the target frequency comprises at least one of the dual-tone multifrequency signal frequencies.

14. The method of claim 11, wherein the second plurality of transform coefficients depends on a harmonic frequency associated with the target frequency, and the method further comprises:

determining a harmonic energy value associated with the harmonic frequency for the second frame based on the second set of transform coefficients; and comparing the harmonic energy value to a harmonic threshold to determine if the signal is present in the second frame.

15. The method of claim 14, wherein comparing the harmonic energy value to the harmonic threshold comprises comparing the harmonic energy value to a static harmonic threshold.

16. The method of claim 14, wherein comparing the harmonic energy value to the harmonic threshold comprises comparing the harmonic energy value to the target energy value.

17. A signal detector, comprising:
   means for receiving a first frame of input samples;
   means for determining a first set of transform coefficients based on a first plurality of frequencies,
   means for determining a first plurality of energy values based on the first set of transform coefficients;
   means for determining a target frequency from the first plurality of frequencies based on the first plurality of energy values;
   means for determining a second set of transform coefficients based on the target frequency;
   means for receiving a second frame of input samples;
   means for determining a second plurality of energy values based on the second set of transform coefficients; and
   means for determining if the signal is present in the input samples based on the second plurality of energy values.

18. The signal detector of claim 1, wherein the second plurality of transform coefficients depends on the first target frequency and a first cutoff frequency associated with the target frequency, the second plurality of energy values includes a target energy value associated with the target frequency and a first cutoff energy value associated with the first cutoff frequency, and the signal detector further comprises:
   a post processing test unit adapted to compare the target energy value to the first cutoff frequency energy value to determine a first frequency offset between the a first tone in the input samples and the target frequency.

19. The signal detector of claim 18, wherein the post processing unit is adapted to multiply the first cutoff energy value by a frequency offset threshold, generate a scaled energy value, and compare the scaled energy value to the target energy value to determine the first frequency offset.

20. The signal detector of claim 19, wherein the first cutoff frequency and the frequency offset threshold correspond to the frequency offset being less than about 3% of the target frequency.

21. The signal detector of claim 19, wherein the second plurality of transform coefficients depends on a second cutoff frequency associated with the target frequency, the second plurality of energy values includes a second cutoff energy value associated with the second cutoff frequency, and the post processing unit is adapted to compare the target energy value to the second cutoff energy value to determine a second frequency offset between the first tone and the target frequency.

22. The signal detector of claim 21, wherein the post processing unit is adapted to multiply the second cutoff energy value by a frequency offset threshold generate a scaled energy value, and to compare the scaled energy value to the target energy value to determine the second frequency offset.

23. The signal detector of claim 22, wherein the second cutoff frequency and the frequency offset threshold correspond to the second frequency offset being less than about 3% of the target frequency.

24. The signal detector of claim 7, wherein the program instructions, when executed by the processor:
   determine a first cutoff frequency associated with the target frequency;
   determine the second set of transform coefficients based on the first cutoff frequency;
   determine a target energy value associated with the target frequency for the second frame as one of the second plurality of energy values;
   determine a first cutoff energy value associated with the first cutoff frequency for the second frame as one of the second plurality of energy values;
   compare the target energy value to the first cutoff energy value to determine a first frequency offset; and
   determine if the first signal is present in the input samples based on the first frequency offset.

25. The signal detector of claim 24, wherein the program instructions, when executed by the processor:
   determine a second cutoff frequency associated with the target frequency;
   determine the second set of transform coefficients based on the second cutoff frequency;
   determine a second cutoff energy value associated with the second cutoff frequency for the second frame as one of the second plurality of energy values;
   compare the target energy value to the second cutoff energy value to determine a second frequency offset; and
   determine if the first signal is present in the input samples based on the second frequency offset.

26. The method of claim 8, further comprising:
   determining a row cutoff frequency associated with the target row frequency and a column cutoff frequency associated with the target column frequency, wherein the second plurality of energy values includes row cutoff energy value based on the row cutoff frequency, and a target cutoff energy based on the column cutoff frequency;
   determining a row frequency offset based on the target row energy value and the row cutoff energy value, and a column frequency offset based on the target column energy value and the column cutoff energy value; and
   determining the presence of the row signal based on the row frequency offset and the presence of the column signal based on the column frequency offset.

27. The method of claim 11, further comprising:
   determining a first cutoff frequency associated with the target frequency;
   determining a target energy value associated with the target frequency for the second frame as one of the second plurality of energy values;
   determining a first cutoff energy value associated with the first cutoff frequency for the second frame as one of the second plurality of energy values;
   comparing the target energy value to the first cutoff energy value to determine a first frequency offset; and
   determining if the signal is present in the input samples based on the first frequency offset.

28. The method of claim 27, further comprising:
   determining a second cutoff frequency associated with the target frequency;
   determining a second cutoff energy value associated with the second cutoff frequency for the second frame as one of the second plurality of energy values;
   comparing the target energy value to the second cutoff energy value to determine a second frequency offset; and
   determining if the signal is present in the input samples based on the second frequency offset.

29. A signal detector, comprising a transform unit adapted to receive at least first and second frames of input samples, determine a first plurality of energy values for the first frame based on a first set of transform coefficients, receive a target frequency identified based on the first plurality of energy values, determine a second set of transform coefficients based on the target frequency, and swap the first and second sets of transform coefficients, and determine a second plurality of energy values for the second frame based on the second set of transform coefficients.

30. A signal detector for detecting a first signal, comprising:
 a processor adapted to receive at least first and second frames of frame of input samples; and
 a memory device coupled to the processor and adapted to store program instructions, that when executed by the processor:
  determine a first set of transform coefficients based on a first plurality of frequencies;
  load the first set of transform coefficients into the memory device;
  determine a first plurality of energy values based on the first set of transform coefficients;
  determine a target frequency from the first plurality of frequencies based on the first plurality of energy values;
  determine a second set of transform coefficients based on the target frequency;
  swap the first set of transform coefficients with the second set of transform coefficients in the memory device;
  receive a second frame of input samples
  determine a second plurality of energy values based on the second set of transform coefficients; and
  determine if the signal is present in the input samples based on the second plurality of energy values.

31. A method for detecting a dual-tone multifrequency signal, comprising:
 receiving a first frame of input samples;
 determining a first set of transform coefficients based on a plurality of row frequencies and a plurality of column frequencies;
 loading the first set of transform coefficients into a memory device;
 determining a plurality of row energy values for the first frame based on the first set of transform coefficients;
 determining a plurality of column energy values for the first frame based on the first set of transform coefficients;
 identifying a maximum row energy value from the plurality of row energy values and a maximum column energy value from the plurality of column energy values, the row frequency corresponding to the maximum row energy value defining a target row frequency and the column frequency corresponding to the maximum column energy value defining a target column frequency;
 determining a row harmonic frequency associated with the target row frequency and a column harmonic frequency associated with the target column frequency;
 receiving a second frame of input samples;
 determining a second set of transform coefficients based on the target row frequency, the target column frequency, the row harmonic frequency, and the column harmonic frequency;
 storing the second set of transform coefficients over the first set of transform coefficients in the memory device;
 determining a second plurality of energy values for the second frame based on the second set of transform coefficients, the second plurality of energy values including a target row energy value, a target column energy, a row harmonic energy value, and a column harmonic energy value;
 determining if a row signal is present in the second frame based on the row harmonic energy value; and
 determining if a column signal is present in the second frame based on the column harmonic energy value.

32. A method for detecting a signal, comprising:
 receiving a first frame of input samples;
 determining a first set of transform coefficients based on a first plurality of frequencies;
 loading the first set of transform coefficients into a memory device;
 determining a first plurality of energy values based on the first set of transform coefficients;
 determining a target frequency from the first plurality of frequencies based on the first plurality of energy values;
 determining a second set of transform coefficients based on the target frequency;
 swapping the first set of transform coefficients with the second set of transform coefficients in the memory device;
 receiving a second frame of input samples;
 determining a second plurality of energy values based on the second set of transform coefficients; and
 determining if the signal is present in the input samples based on the second plurality of energy values.

33. A signal detector, comprising:
 means for receiving a first frame of input samples;
 means for determining a first set of transform coefficients based on a first plurality of frequencies;
 means for loading the first set of transform coefficients into a memory device;
 means for determining a first plurality of energy values based on the first set of transform coefficients;
 means for determining a target frequency from the first plurality of frequencies based on the first plurality of energy values;
 means for determining a second set of transform coefficients based on the target frequency;
 means for swapping the first set of transform coefficients with the second set of transform coefficients in the memory device;
 means for receiving a second frame of input samples;
 means for determining a second plurality of energy values based on the second set of transform coefficients; and
 means for determining if the signal is present in the input samples based on the second plurality of energy values.

* * * * *

UNITED STATES PATENT AND TRADEMARK OFFICE
CERTIFICATE OF CORRECTION

PATENT NO. : 6,771,767 B1  
APPLICATION NO. : 09/225276  
DATED : August 3, 2004  
INVENTOR(S) : Jin Li and Yan Zhou It is certified that error appears in the above-identified patent and that said Letters Patent is hereby corrected as shown below:

In column 4, line 33, replace "DTMT" with --DTMF--.

In claim 7, column 7, line 38, replace the "," with --;--.

In claim 7, column 7, line 46, replace "samples" with --samples;--.

In claim 17, column 9, line 8, replace the "," with --;--.

In claim 30, column 11, line 29, replace "samples" with --samples;--.

Signed and Sealed this

First Day of May, 2007

JON W. DUDAS  
*Director of the United States Patent and Trademark Office*